United States Patent
Osaki

(10) Patent No.: US 11,528,766 B2
(45) Date of Patent: Dec. 13, 2022

(54) ELECTRONIC DEVICE

(71) Applicant: BROTHER KOGYO KABUSHIKI KAISHA, Nagoya (JP)

(72) Inventor: Masayoshi Osaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/504,605

(22) Filed: Oct. 19, 2021

(65) Prior Publication Data
US 2022/0159766 A1    May 19, 2022

(30) Foreign Application Priority Data
Nov. 19, 2020   (JP) .............. JP2020-192539

(51) Int. Cl.
| | | |
|---|---|---|
| *G06F 15/00* | (2006.01) | |
| *G06F 3/12* | (2006.01) | |
| *G06K 1/00* | (2006.01) | |
| *H04W 76/18* | (2018.01) | |
| *H04N 1/00* | (2006.01) | |
| *H04W 76/11* | (2018.01) | |

(52) U.S. Cl.
CPC .......... *H04W 76/18* (2018.02); *G06F 3/1204* (2013.01); *G06F 3/1236* (2013.01); *H04N 1/00411* (2013.01); *H04W 76/11* (2018.02); *G06F 3/1292* (2013.01)

(58) Field of Classification Search
CPC .. H04W 76/18; H04W 76/11; H04N 1/00411; G06F 3/1204; G06F 3/1236; G06F 3/1292

USPC .............. 358/1.15, 1.14, 1.13, 1.1
See application file for complete search history.

(56) References Cited

U.S. PATENT DOCUMENTS

| | | | | |
|---|---|---|---|---|
| 9,736,871 | B2 * | 8/2017 | Kim ............ | H04W 8/26 |
| 2014/0362842 | A1 * | 12/2014 | Dong ............ | H04W 48/12 370/338 |
| 2016/0323916 | A1 * | 11/2016 | Lee ............ | H04W 76/10 |
| 2017/0041860 | A1 | 2/2017 | Ogawa et al. | |

FOREIGN PATENT DOCUMENTS

JP           2017-034560 A    2/2017

* cited by examiner

*Primary Examiner* — Douglas Q Tran
(74) *Attorney, Agent, or Firm* — Scully, Scott, Murphy & Presser, PC

(57) ABSTRACT

A controller of an electronic device starts a setup procedure according to a first method. In the setup procedure according to the first method, the controller notifies a start of the setup and attempts to obtain connection information from an external device. When the connection information is obtained, the controller stores the connection information and attempts to connect to an access point using the connection information. When the connection information is not obtained in the setup procedure according to the first method, the controller starts a setup procedure according to a second method to display a message requesting input of the connection information, obtain the connection information through an input interface, and attempt to connect to the access point of the wireless network using the obtained.

10 Claims, 8 Drawing Sheets

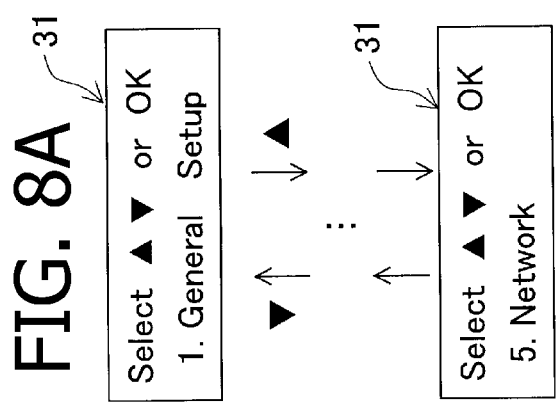
FIG. 8A
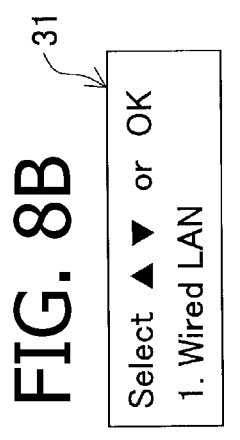
FIG. 8B
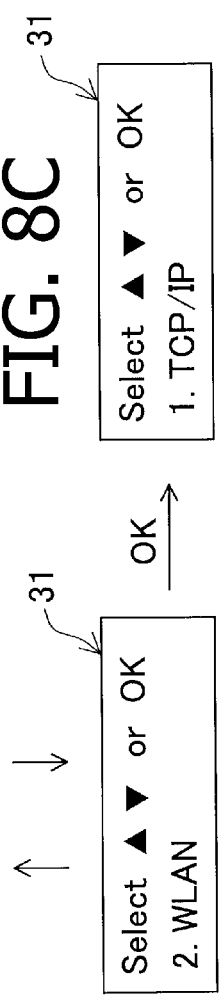
FIG. 8C
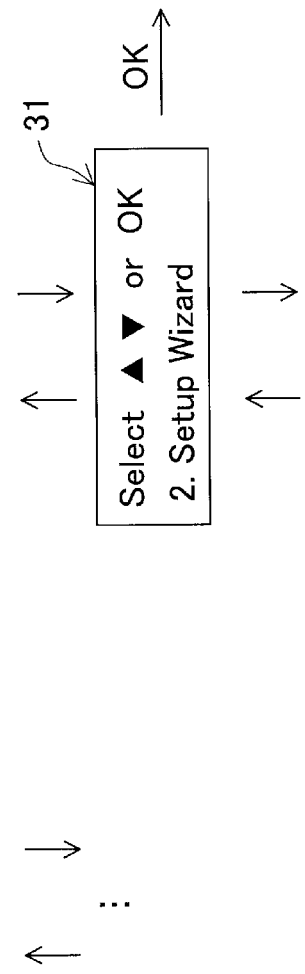

ELECTRONIC DEVICE

CROSS-REFERENCE TO RELATED APPLICATIONS

This application claims priority under 35 U.S.C. § 119 from Japanese Patent Application No. 2020-192539 filed on Nov. 19, 2020. The entire subject matter of the application is incorporated herein by reference.

BACKGROUND

Technical Field

Aspects of the present disclosures relate to electronic devices configured to be connected to a wireless network.

Related Art

Recently, systems configured to connect multiple electronic devices to a wireless network have been known. In order to connect each electronic device to the wireless network, each electronic device needs to be set up to connect to an access point of the wireless network. In a setup process, for example, the electronic device is switched to a connection information input mode, and the connection information input by the user operation is used to connect to the access point of the wireless network.

There are also known techniques for automating such a setup process. For example, there is known a configuration in which a wireless communication device (e.g., a PC) stores connection information, the wireless connection device sends the connection information to a wireless communication device (e.g., a printer) that is not yet connected to the wireless network, and the unconnected wireless communication device uses the connection information to connect to an access point of the wireless network.

SUMMARY

According to aspects of the present disclosure, the controller can start a setup procedure according to a first method as the particular button is operated. In the setup procedure according to the first method, the controller notifies a start of the setup in the setup procedure according to the first method, and attempts to obtain connection information from an external device according to a first procedure. When the connection information is obtained successfully in the setup procedure according to the first method, the controller can store the connection information, which is obtained according to the first procedure, in the memory, and attempt to connect to an access point of a wireless network using the connection information, which is obtained according to the first procedure. Further, when the connection information is not obtained in the setup procedure according to the first method, the controller can start a setup procedure according to a second method. In the setup procedure according to the second method, the controller can display a message requesting input of the connection information on the display. In the setup procedure according to the second method, the controller can obtain the connection information according to a second procedure, the connection information including characters input through the input interface, In the setup procedure according to the second method, the controller can store the connection information, which is obtained according to the second procedure, in the memory. In the setup procedure according to the second method, the controller can attempt to connect to the access point of the wireless network using the connection information obtained according to the second procedure.

BRIEF DESCRIPTION OF THE DRAWINGS

FIGS. 8A, 8B and 8C show an example of transition of an input screen.

DETAILED DESCRIPTION

Hereinafter, an MFP (multifunction peripheral) 1 according to an embodiment of the present invention will be described in detail with reference to the accompanying drawings.

Figure 1:
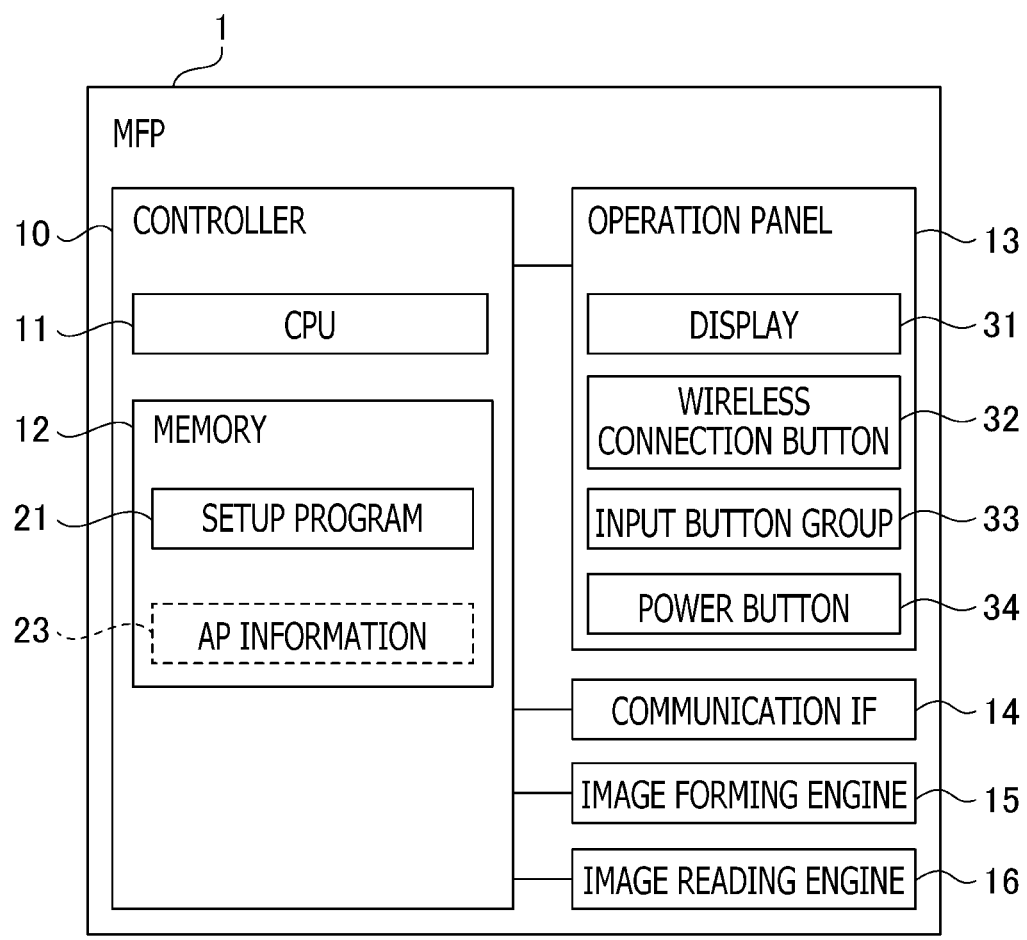
FIG. 1 is a block diagram of an electrical configuration of an MFP.

The MFP 1 according to the present embodiment has a controller 10 including a CPU 11, a memory 12, and the like, as shown in FIG. 1. The MFP 1 is also provided with an operation panel 13, a communication interface (hereinafter referred to as a "communication IF") 14, an image formation engine 15, and an image reading engine 16, which are electrically connected to the controller 10. The MFP 1 is an example of an electronic device, and the CPU 11 is an example of a computer.

The CPU 11 performs various processes according to programs retrieved from the memory 12 and based on user's operations. As shown in FIG. 1, various programs including a setup program 21 and various data are stored in the memory 12. The memory 12 is also used as a work area when various processes are performed. It is noted that a buffer provided to the CPU 11 is an example of the memory.

An example of the memory 12 is not necessarily limited to a ROM, a RAM, an HDD and the like which are built into the MFP 1, but can also be a storage medium that is readable and writable by the CPU 11. A computer-readable storage medium is a non-transitory medium. The non-transitory medium includes recording media such as a CD-ROM, a DVD-ROM, and the like in addition to the above examples. The non-transitory medium is also a tangible medium. On the other hand, an electrical signal carrying a program that is downloaded from a server on the Internet or the like is a computer-readable signal medium, which is a kind of computer-readable medium, but is not included in the non-transitory computer-readable storage media.

Figure 2:
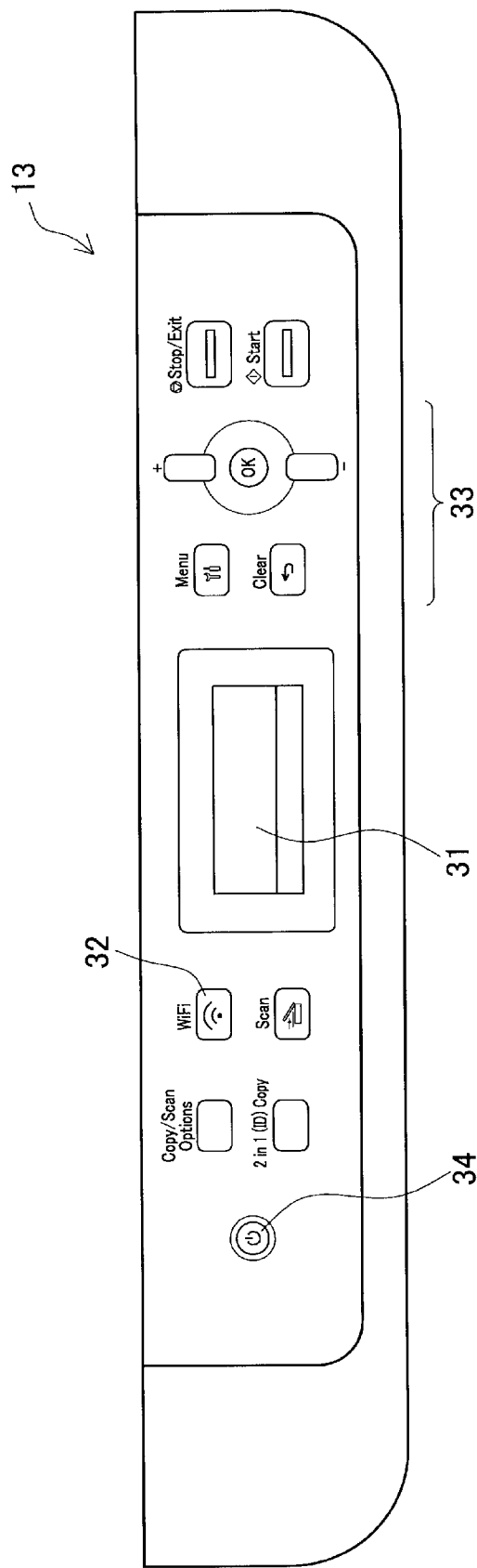
FIG. 2 shows an example of an appearance of an operation panel of the MFP.

The operation panel 13 includes hardware for displaying a screen for notifying the user of information, and hardware for receiving operations by the user. The operation panel 13 of the MFP 1 according to the present embodiment includes, for example, a display 31, a wireless connection button 32, an input button group 33, and a power button 34, as shown in FIG. 2 which shows an example of an appearance of the MFP 1. The wireless connection button 32 is an example of a particular button, and the input button group 33 is an example of an input interface. The input button group 33 has a plurality of input buttons, including, for example, direction buttons indicating respective directions such as up, down, right and left, and an OK button. The display 31 according to the present embodiment of MFP 1 is, for example, a monochrome liquid crystal display configured to display two vertical lines of character strings, and does not have an input acceptance function.

The communication IF 14 includes hardware configured to connect to a wireless LAN using the Wi-Fi (registered trademark) method. The MFP 1 according to the present embodiment is equipped with both the connection function according to a Wi-Fi direct method (hereinafter referred to as the "WFD method") and the connection function according to the wireless LAN method using an access point (hereinafter referred to as the "WLAN method"). The WFD method is an example of a first wireless communication method, and the WLAN method is an example of a second wireless communication method.

The MFP 1 stores the connection information of the WFD method in advance, and when the connection function of the WFD method is enabled, the MFP 1 configured to serve as a group owner device that manages the network and establishes a wireless network with client devices. In addition, the MFP 1 is configured to connect to a wireless network using the WLAN method as a client device by transmitting the connection information of the access point (hereinafter referred to as the "AP information") to the access point. It is noted that the AP information 23 (indicated by broken lines in FIG. 1) is not stored in the memory 12 when the MFP 1 is shipped from the factory.

The image formation engine 15 includes a configuration to print an image based on image data on a sheet or other printing medium. An image forming system of the image formation engine 15 is, for example, an electrophotographic system or an inkjet system. The image reading engine 16 includes a configuration to read an image formed on a document and generate image data.

Next, a procedure of setting up the MFP 1 to connect to a wireless network will be described. The following processes basically show the processes of the CPU 11 according to the instructions described in a program. In other words, "determination," "extraction," "selection," "calculation," "decision," "identification," "obtaining," "reception," "control," and the like in the following description represent processing by the CPU 11. The processing by the CPU also includes hardware control using the API of the OS. In this specification, the indication of the OS is omitted when the operation of each program is described. In other words, in the following description, a statement meaning that "a program B controls hardware C" may mean that "a program B controls hardware C using the API of the OS." In addition, the processing of the CPU 11 according to the instructions described in the program may be described in simplified wording. For example, in the above-described case, the processing performed by the CPU 11 may be described using an expression "the CPU 11 performs the processing." Further, the processing of the CPU 11 according to the instructions described in the program may be described in a phrase that omits the tern "CPU," such that "the program A performs the processing.

It is noted that the term "obtain(ing)" is used in a concept that does not require a request. In other words, the process of the CPU 11 receiving data without requesting the same is also included in the concept of "the CPU obtaining data." Further, the term "data" in this specification is represented by a computer-readable bit string. Further, data with the same substantive meaning/content but different formats will be treated as the same data. The same applies to "information" in this specification. In addition, "requesting" and "indicating" are concepts representing that information indicating what is being requested or indicated is to be output to the other party. The information representing that it is being requested or instructed is also described simply as "requesting" or "indicating."

Further, a process by which the CPU 11 determines whether information A indicates matter B or not may be described conceptually such that the CPU 11 "determines whether a matter is the matter B or not based on the information A." Similarly, a process by which the CPU 11 determines whether information A indicates matter B or matter C may be conceptually described such that the CPU 11 "determines whether a matter is the matter B or the matter C based on the information A."

The MFP 1 according to the present embodiment has two methods (a first method and a second method) of completing the setup procedure. The setup procedure is a procedure of setting up a connection according to the WLAN method using the access point. In the setup procedure, the MFP 1 obtains the AP information of the access point to be connected, stores the AP information in the memory 12, and connects to the access point via the communication IF 14 with use of the stored AP information to.

The first method is a setup procedure of communicating with a terminal device, for example, a personal computer (hereinafter referred to as "PC"), that has already successfully connected to an access point (hereinafter referred to as "target AP") to which the MFP1 is to be connected to obtain the AP information from the terminal device. The first method is to obtain the AP information from the terminal device without requiring a procedure of text input by the user of the AP information. On the other hand, the second method is a setup procedure of obtaining the AP information by receiving the input of information by the user without using a terminal device. The second method includes a procedure of obtaining at least a part of the AP information by the user's character input, for example, via the input button group 33. When the MFP 1 according to the present embodiment receives an operation to the wireless connection button 32 of the operation panel 13, the MFP 1 attempts the setup procedure according to the first method, and when the setup according to the first setup procedure cannot be completed, the MFP 1 attempts the setup procedure according to the second method.

Figure 3A:
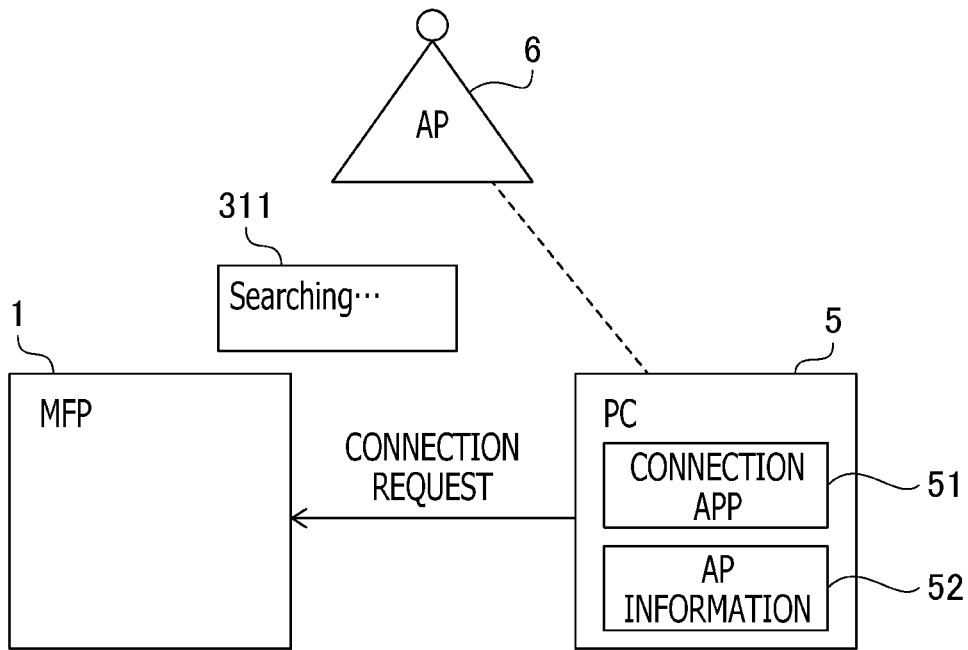
FIGS. 3A and 3B illustrate an outline of a setup procedure according to a first method.
Figure 3B:
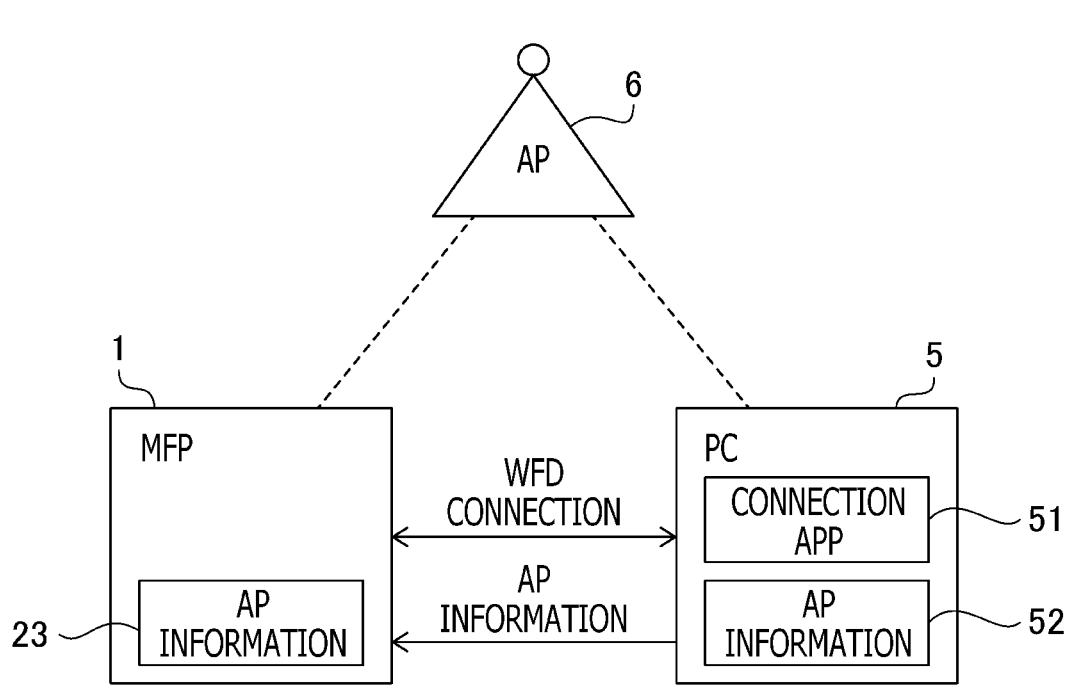

An outline of the set procedure according to the first method is illustrated in FIGS. 3A and 3B. In the setup procedure according to the first method, the user prepares a PC5 that already has the AP information of a target AP 6. The target AP 6 has, as shown in FIGS. 3A and 3B, a connection application 51 and AP information 52 which is the connection information of the target AP6, and is configured to wirelessly communicate with the target AP 6. The connection application 51 is an application program configured to cause the PC 5 to perform a process of transmitting the AP information 52. The connection application 51 is an example of a program configured to transfer the AP information.

By executing the connection application 51 based on the user's instructions or the like, the PC 5 requests a device, which is a transmission target of the AP information 52, to connect in accordance with the WFD method, as shown in FIG. 3A. The connection application 51 has the connection information of the MFP 1 according to the WFD method in advance, and the PC 5 which is running the connection application 51 sends out a connection request according to the WFD method using the connection information. It is noted that, when receiving an instruction to execute the connection application 51, the PC 5 may display, on the user interface of the PC 5 itself, a message including an instruction to enable the connection function according to the WFD method in the transmission target device (e.g., an instruction to operate the wireless connection button 32 of the MFP 1). Then, the user operates the wireless connection button 32 on the operation panel 13 at the MFP 1 in which the setup procedure is to be executed.

Figure 4:
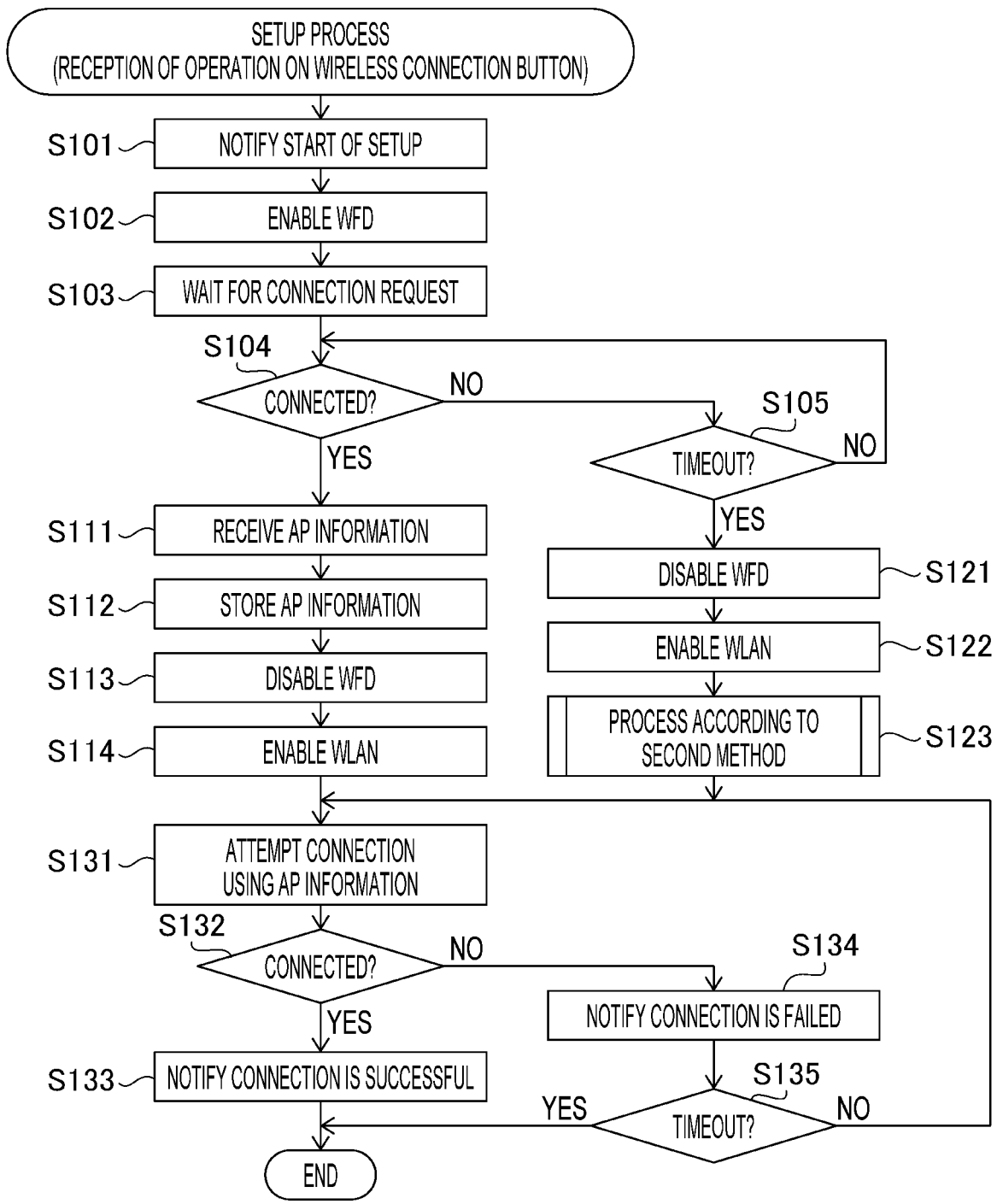
FIG. 4 is a flowchart illustrating the setup process.

The procedure of the setup process will be described with reference to a flowchart shown in FIG. 4. The setup process is executed by the CPU 11 of the MFP 1 in response to an operation of the wireless connection button 32.

When the wireless connection button 32 is operated by the user, the CPU 11 informs the user that the setup procedure for obtaining the AP information has started (S101). The CPU 11 displays a message 311 indicating that the setup procedure is in progress on the display 31, for example, as shown in FIG. 3A. Optionally or alternatively, when, for example, the wireless connection button 32 is provided with a backlight, the CPU 11 may inform by changing the lighting pattern, such as by blinking or lighting the backlight. After the wireless connection button 32 is operated and before execution of S101, the CPU 11 may display a display inquiring whether to start the setup procedure, and receive the user's instruction.

In addition, the CPU 11 enables the connection function according to the WFD method of the device itself (S102). Then, the CPU 11 waits to receive a connection request according to the WFD method from a terminal device (S103). As a result, the MFP 1 detects the PC 1 and other devices in a surrounding area by the wireless communication according to the WFD method. Then, the CPU 11 determines whether the connection with the terminal device according to the WFD method has been successfully established (S104).

The MFP 1 can establish the wireless communication with the PC 5 according to the WFD method by responding to the connection request originated from PC 5. When it is determined that wireless communication with the terminal device has not been established (S104: NO) due to, for example, reception of no connection request, the CPU 11 determines whether a particular timeout period has elapsed (S105). When it is determined that the timeout time has not elapsed (S105: NO), the CPU 11 waits until either the terminal device is connected or the timeout period has elapsed. The timeout period may be a particular fixed time or a variable period based on a user's instructions, or the like. When the MFP 1 receives the connection requests from multiple terminal devices, the MFP 1 may accept a selection of a connection destination by the user operation, or the MFP 1 may make a negative decision at S104 (S104: NO) determining that a connection error has occurred.

When it is determined that the wireless communication using the WFD method has been successfully established and the MFP 1 has been connected to the PC 5 (S104: YES), the CPU 11 receives the AP information 52 from the PC 5 (S111), which is the connected terminal device. Then, the CPU 11 stores the AP information 52 received from the PC 5 in the memory 12 as the AP information 23 (S112). The PC 5 transmits the AP information 52 in response to a request from the MFP 1 by the function of the connection application 51. Concretely, after successfully connecting with the PC 5, the MFP 1 transmits a signal, to the PC 5, requesting for the AP information 52. Then, for example, as shown in FIG. 3B, the MFP 1 obtains the AP information 52 from the PC 5 and stores the received AP information 52 in the memory 12.

As described above, it becomes possible that the MFP 1 communicates wirelessly with the target AP 6 according to the WLAN method using the AP information 23 stored in the memory 12. For example, the MFP 1 can connect to the PC 5 or the like via the target AP 6 using the AP information 23, and receive print jobs. It is noted that, when the information is already contained in the AP information 23, the CPU 11 overwrites the AP information 23. That is, the information of only one access point is contained in the AP information 23. The CPU 11 may inquire whether to overwrite the AP information 23. It is noted that the AP information 23 may contain multiple pieces of information. For example, an SSID (Service Set IDentifier) is an example of a part of the AP information 23.

In S113, the CPU 11 disables the connection function according to the WFD method that was started in S102. The CPU 11 may disconnect the connection with the PC 5 before execution of S113. Furthermore, the CPU 11 enables the connection function according to the WLAN method (S114).

The procedure of MFP 1 connecting to a terminal device according to the WFD method and receiving the AP information from the terminal device, i.e., the procedure from S102 to S112, is an example of a first procedure. The first procedure does not include an input operation to the input button group 33 by the user. In other words, in the setup procedure according to the first method, by using the PC 5 implemented with the connection application 51, the MFP 1 can obtain the AP information 52 without receiving any input operation by the user after receiving the operation of the wireless connection button 32. The first procedure may include a small number of user operations, such as an operation of an instruction to start the setup process, an operation of selecting the AP information in a case where multiple AP information is obtained, and the operation of selecting the device in a case where connection requests from multiple terminal devices are received.

On the other hand, when the MFP 1 fails to communicate with the terminal device according to the WFD method, such as failing to receive a connection request from the terminal device such as the PC 5, the MFP 1 automatically starts the setup procedure according to the second method. When it is determined that a waiting period for the connection request has reached the timeout period (S105: YES), the CPU 11 disables the connection function according to the WFD method (S121) and enables the connection function according to the WLAN method (S122). Alternatively, the CPU 11 may inform the user that the obtaining of AP information in the setup procedure of the first method has failed. Then, the CPU 11 may ask the user whether to attempt to obtain the AP information in the setup procedure of the second method after the connection according to the WFD method times out.

When the wireless connection button 32 is operated at the MFP 1 but the MFP 1 does not accept the connection request according to the WFD method within a particular period, such as a case where the communication according to the WFD method between the terminal device running the connection application and the MFP 1 is not possible, the MFP 1 stops attempting to connect to the terminal device according to the WFD method. Also, when the connection with the PC 5 is successful but the AP information 52 cannot be received since the execution of the connection application 51 on the PC 5 is interrupted, or since the PC 5 does not have appropriate AP information 52, the MFP 1 starts the setup procedure according to the first method and starts the setup procedure according to the second method.

Figure 5:
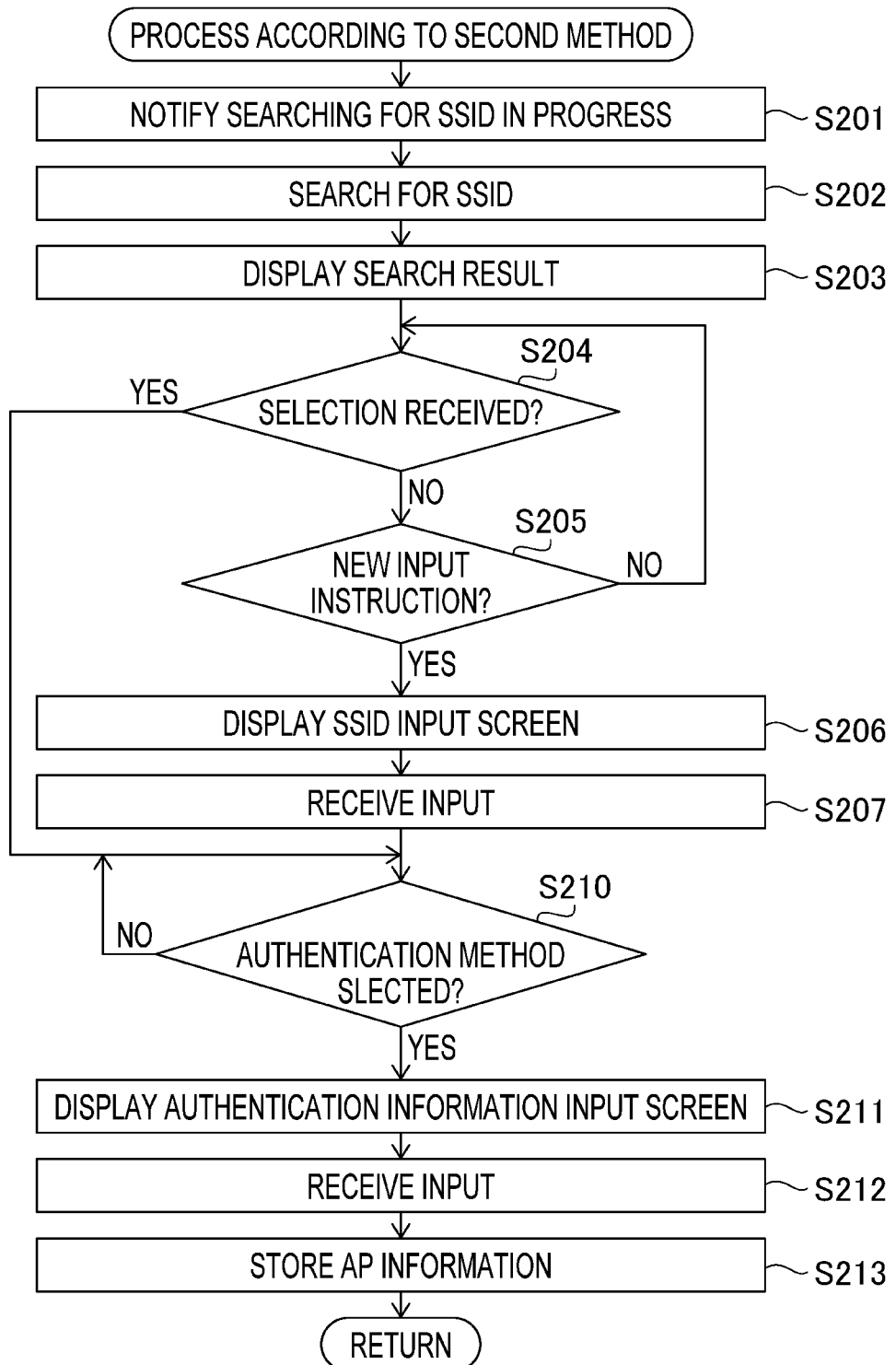
FIG. 5 is a flowchart illustrating a setup process according to a second method.
Figure 6A:
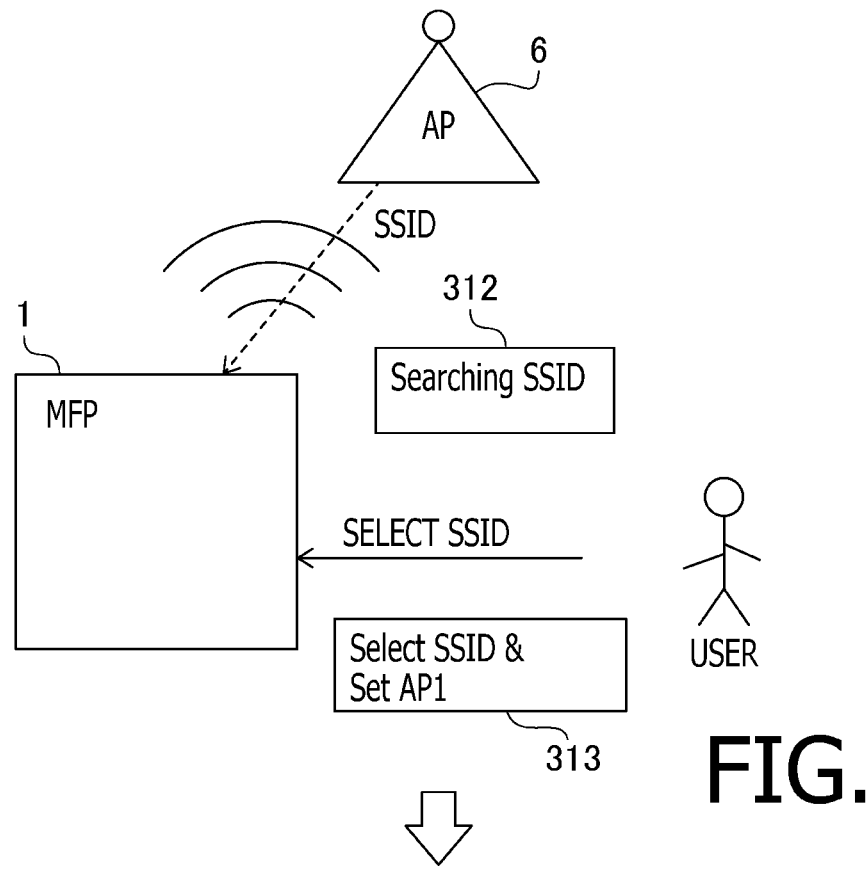
FIGS. 6A and 6B illustrate an outline of the setup procedure according to a second method.
Figure 6B:
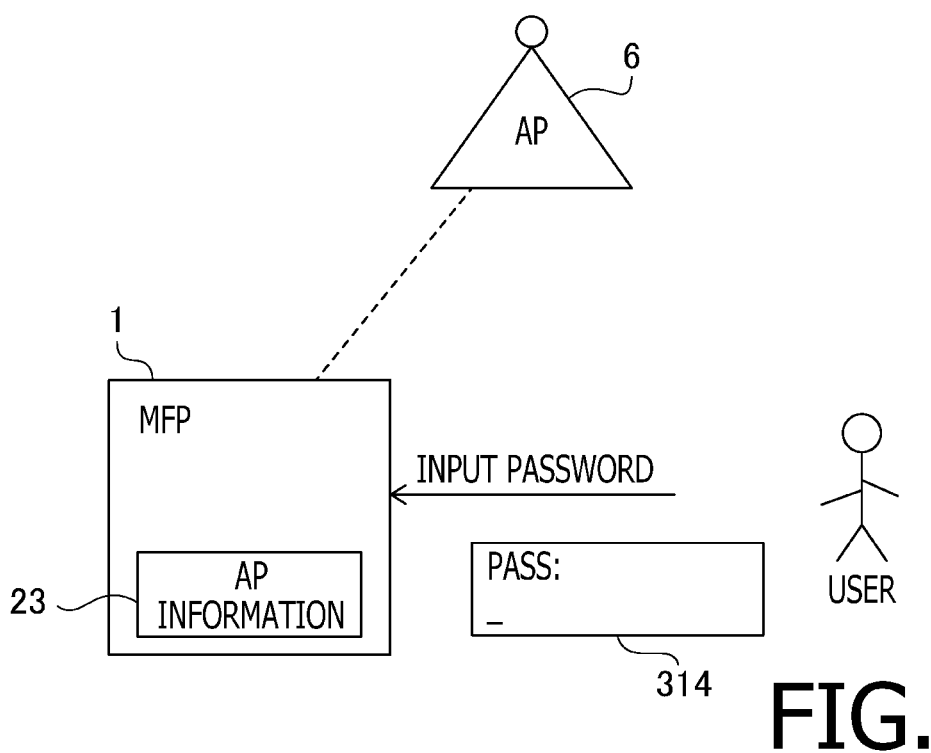

Then, the CPU 11 performs the procedure according to the second method (S123). The procedure according to the second method is a process to perform a setup procedure according to the second method. The procedure according to the second method will be explained with reference to a flowchart shown in FIG. 5. An outline of the setup procedure according to the second method is illustrated in FIGS. 6A and 6B.

In the second method process, the CPU 11 notifies that the setup procedure according to the second method has been started. Concretely, the CPU 11 notifies that the SSID of an access point that is connectable is being searched (S201). The CPU 11 displays, for example, a message 312 indicating that the SSID search is in progress on display 31, as shown in FIG. 6A. By notifying that the second method has been started, the user can recognize, for example, that communication with the PC 5 according to the WFD method has failed.

In the second method, the MFP 1 searches for an access point that can communicate according to the WLAN method (S202), and waits for a response signal including the SSID from the access point. In the setup procedure according to the second method, the MFP 1 transmits a search signal to search for an access point via the communication IF 14, for example, as shown in FIG. 6A, and waits for a response signal from the target AP 6 or the like.

Upon receiving the response signal, the CPU 11 displays a list of search results on the display 31 (S203) and receives a selection input by the user. Selectable items in the search result list include, in addition to the list of names of SSIDs found by the search, an item to receive an instruction to input a new SSID. Since the display 31 of the MFP 1 according to the present embodiment can display only two lines, the CPU 11 displays, for example, an input reception message 313 including one of the search results, as shown in FIG. 6A, changes displayed selectable items in response to an operation input to the directional buttons in the input button group 33, and receives the decision of the selection in response to an operation of the OK button.

The CPU 11 determines whether a selection of the SSID found by the search has been accepted (S204). When it is determined that the selection of the SSID has not been accepted (S204: NO), the CPU 11 determines whether an instruction to input a new SSID has been accepted (S205). When it is determined that the instruction to input a new SSID is not received (S205: NO), the CPU 11 waits until either the selection of the SSID or the new input of the SSID is received.

When it is determined that the instruction for inputting a new SSID is received (S205: YES), the CPU 11 displays an input screen on the display 31 to start receiving the input of the new SSID (S206) and receives the input (S207). The CPU 11 receives the input of a character one by one, for example, by the user operation of one of the input buttons 33 on the operation panel 13.

After execution of S207, or when it is determined that the selection of the SSID has been received (S204: YES), the CPU 11 receives a selection of the authentication method (S210). The MFP 1 according to the present embodiment supports multiple authentication methods such as, for example, an open system authentication, a shared key authentication, and a user authentication using a user ID and a password. In S210, the CPU 11 displays, for example, the selectable authentication method options on the display 31, and receives the selection of one of the options by the user input of the OK button. When it is determined that the selection of the authentication method option is not received (S210: NO), the CPU 11 waits until the selection of the authentication method option is received (S210: NO).

When it is determined that the selection of the authentication method has been received (S210: YES), the CPU 11 displays, on the display 31, an input screen for the authentication information to be used in the selected authentication method (S211) and receives the input (S212). For example, when the authentication method using the combination of the SSID and the password is selected, the CPU 11 displays an input screen 314 on the display 31 to start receiving the input of the password, as shown in FIG. 6B, for example, in S211, and receives the input of the password by the user. The password is an example of a remainder of the AP information. The MFP 1 receives the input of the password, for example, by a user input of one character at a time by the user operation of the input button group 33 of the operation panel 13. The procedure for obtaining the AP information including the character input by the user via the input button group 33 is an example of a second procedure.

The CPU 11 stores a pair of the SSID determined by the selection in S204 or the input in S207 and the password received in S212 in the memory 12 as the AP information 23 (S213). Then, the CPU 11 terminates the second method processing, and returns to the setup process. In S213, the CPU 11 overwrites the AP information 23. When the selected authentication method is the open system authentication, no additional input of the password or other information is required, and the CPU 11 skips S211 and S212 and stores the SSID in the memory 12 as the AP information 23.

After the execution of S114 or after the completion of the second method processing in S123, the CPU 11 attempts to connect to the target AP 6 according to the WLAN method using the AP information 23 stored in the memory 12 (S131). Then, the CPU 11 determines whether the connection is successful (S132). When it is determined that the connection is successful (S132: YES), the CPU 11 notifies the successful connection (S133).

On the other hand, when it is determined that the connection has failed (S132: NO), the CPU 11 notifies the user of the connection failure (S134). In S134, the CPU 11 notifies the user that the connection to the target AP 6 has failed although the setup was successful. It is noted that the content notified in S134 is different from the notification in S201 of the second method process. With this notification, the CPU 11 can suggest, to the user, a possibility of a problem on the target AP 6 side, such as a power not being turned on, or, in a case where the setup procedure according to the second method is performed, an input error of the password or the like.

Further, the CPU 11 performs a particular time or a particular number of attempts after starting the connection attempt, and determines whether the connection attempt times out (S135). When it is determined that the timeout does not occur (S135: NO), the CPU 11 returns to S131 and retries the connection to the target AP 6. After execution of S133 or when it is determined that the timeout occurs (S135: YES), the CPU 11 terminates the setup process. It is noted that the CPU 11 may wait for receipt of the user's operation to the OK button or the like before terminating the setup process, and terminate the setup process after the receipt. Further, even if the connection to the target AP 6 fails, since the AP information 23 is stored in the memory 12, the MFP 1 can attempt to connect to the target AP 6, for example, on a regular basis.

Figure 7:
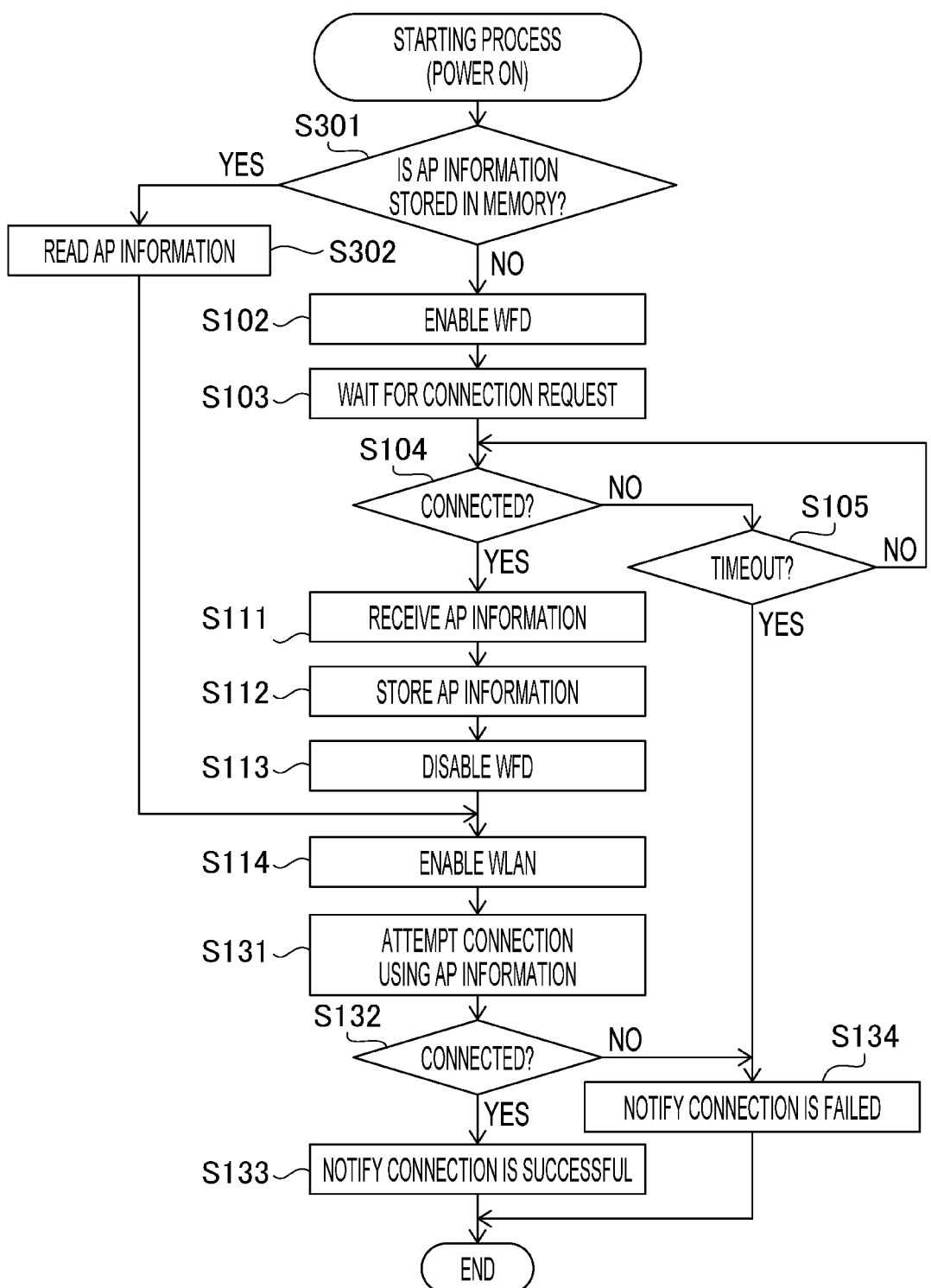
FIG. 7 is a flowchart illustrating a start process.

Next, a setup procedure, which is different from the setup process described above, will be described. When the power button 34 (see FIG. 2) of the operation panel 13 is operated in a state where the AP information 23 is not stored in the memory 12, the MFP 1 according to the present embodiment automatically starts the setup procedure even if the operation to the wireless connection button 32 is not received. The procedure of the start process including the automatically executed setup procedure will be described with reference to a flowchart shown in FIG. 7. The start process is executed by the CPU 11 of the MFP 1 in response to a power-on of the MFP 1. In the start process, the same procedures as in the setup process shown in FIG. 4 are indicated with the same signs as in FIG. 4 and descriptions thereof will be simplified.

In the start process, the CPU 11 first determines whether the AP information 23 is stored in the memory 12 (S301). When it is determined that the AP information 23 is stored in the memory 12 (S301: YES), the CPU 11 reads out the stored AP information 23 (S302).

When it is determined that the AP information 23 is not stored in the memory 12 (S301: NO), the CPU 11 starts the setup procedure according to the first method. Concretely, the CPU 11 enables the connection function according to the WFD method (S102) and waits for a connection request from the terminal device (S103 to S105). When it is determined that the connection with the terminal device has been established (S104: YES), the CPU 11 receives the AP information from the terminal device (S111), stores the received AP information in the memory 12 (S112), and disables the connection function according to the WFD method (S113). In other words, when the power button 34 is operated while the AP information 23 is not stored in the memory 12, the MFP 1 according to the present embodiment starts the setup procedure according to the first method without receiving the user operation to the wireless connection button 32. It is noted that the acceptance of the power-on by the user operation to the power button 34 is an example of satisfying a particular connection condition.

After execution of S302 or S113, the CPU 11 enables the connection function according to the WLAN method (S114) and attempts to connect to the target AP 6 using the AP information 23 stored in the memory 12 (S131). When it is determined that the connection to the target AP 6 has been successfully established (S132: YES), the CPU 11 notifies the successful connection (S133). The CPU 11, for example, displays a message indicating the successful connection on the display 31, and notifies that the connection to the wireless network through the access point has been completed. The CPU 11 may, for example, display a Wi-Fi symbol on the display 31, or turn on the backlight of the wireless connection button 32.

On the other hand, when it is determined that the connection with the terminal device has failed (S105: YES) or that the connection to the target AP 6 using the AP information 23 has failed (S132: NO), the CPU 11 notifies the connection failure (S134). It is noted that, when the AP information 23 is stored in the memory 12, the CPU 11 may retry the connection to the target AP 6.

In this way, the setup procedure according to the first method is started immediately after the power is turned on, and the connection to the access point is attempted, thus saving the user the trouble of operating the wireless connection button 32. However, since the setup procedure in this case is not initiated by the user's input operation, the user may be confused if the setup procedure of the second method is automatically initiated and the user is asked to input the operation. In the MFP 1 according to the present embodiment, the start process does not start the setup procedure of the second method even when the AP information 23 could not be obtained by the first method, thus reducing the possibility of the user being confused.

Next, a procedure of starting the setup procedure according to the second method based on the user operation will be described. The MFP 1 according to the present embodiment is also configured to receive an instruction to start the setup procedure according to the second method by an operation different from the operation of the wireless connection button 32 to start the setup process described above. That is, by multiple selection operations on the input button group 33, the MFP 1 can receive the instruction to start the setup procedure according to the second method without trying the setup procedure according to the first method.

When receiving an operation to the menu button, for example, the MFP 1 displays various menus as selectable and receives the user's selection. The display 31 of the MFP 1 according to the present embodiment is configured to display only two lines of text, and, as shown in FIGS. 8A-8C, only an instruction indicating an operation method and one selectable item are displayed. In order to change the displayed selectable item, the user needs to perform an operation to the directional button of the input button group 33.

Concretely, as shown in FIG. 8A, the MFP 1 displays selectable items of a menu one by one when the MFP 1 receives the operation of the menu button. When the network setting is selected as the user operates the direction button and the OK button, the MFP 1 receives the selection of the communication method, as shown in FIG. 8B. Furthermore, when the user selects the WLAN, the MFP 1 receives the selection of the setup procedure method, as shown in FIG. 8C.

Upon receiving the instruction to execute a setup wizard according to the WLAN method, the MFP 1 searches for the SSID, receives the user's selection from the search results, and further receives the selection of the authentication method and the input of authentication information, the MFP 1 attempts to obtain the AP information of the target AP 6 in the same way as the second method processing described above. According to the above procedure, the MFP 1 also store the AP information of the target AP 6 in memory 12 upon obtaining the same, and the MFP 1 attempts to connect to the target AP 6.

As described in detail above, as the single wireless connection button 32 is operated, the MFP 1 according to the present embodiment starts the setup procedure according to the first method, in which the AP information is obtained from the terminal device and setup is automatically performed, and when the AP information cannot be obtained in the first method, the setup procedure according to the second method, in which the AP information is obtained by the input operation on the input button group 33, is automatically started. This makes it possible for the user to have the MFP 1 attempt the setup procedures according to the two methods by one simple operation of operating the wireless connection button 32, thus improving the operability of the setup for connecting to the access point of the wireless network.

Further, the MFP 1 according to the present embodiment switches between the WFD method and the WLAN method for wireless communication simply by receiving the operation of the wireless connection button 32. That is, priority is given to receipt of the AP information from terminal devices that can provide the AP information, and even if the AP information cannot be obtained, the MFP 1 continues to search for access points that can be connected, thus increasing the possibility of obtaining information that leads to the input of AP information.

Furthermore, since the MFP1 according to the present embodiment attempts to obtain the AP information such that, in the first procedure, the MFP 1 obtains the AP information from the terminal device such as the PC 5 without communicating with the access point, while in the second procedure, the MFP 1 communicates with the access point to obtain part of the AP information. Therefore, the possibility of obtaining the AP information is increased. In addition, when obtaining the AP information in the first procedure fails, and when the connection to the access point using the obtained AP information fails, different pieces of information are notified, respectively, which makes it easy to understand the next action to be taken by the user in either case.

Further, the MFP 1 according to the present embodiment performs the setup process when the wireless connection button 32 is operated, regardless of whether the AP information 23 is stored in the memory 12 or not, and overwrites the AP information 23 in the memory 12 when the AP information is obtained in the setup process. Therefore, even when, for example, the user wishes to update the AP information 23, the user only needs to operate the wireless connection button 32 in the same way as the first time, regardless of the method used to obtain the AP information 23 which has been already stored in the memory 12. Thus, the operation is simple and safe.

Furthermore, according to the present embodiment, instead of operating the wireless connection button 32, the MFP 1 can also start the setup procedure according to the second method by operating the input button group 33. However, when an area of the display 31 to display contents is small and there are not many types of buttons included in the input button group 33 as in the MFP 1 according to the present embodiment, the operation method tends to be difficult to understand and the number of operations tends to increase. Therefore, the input operation until the setup procedure according to the second method is started tends to be complicated. If the MFP 1 cannot obtain the AP information 23 in the setup procedure according to the first method only by operating the wireless connection button 32, the MFP 1 according to the present embodiment does not require multiple operations of the input button group 33 and automatically starts the setup procedure according to the second method, thus requiring less time and effort for the user.

It is noted that the configuration described above is merely an example and does not limit aspects of the present disclosures in any way. Therefore, the technology disclosed herein can naturally be improved and modified in various ways without departing from aspects of the present disclosures. For example, an example of an electronic device may include a general home or office printer, a scanner, a multifunction peripheral, a sewing machine, a label printer, an industrial printer, a 3D printer, or a machine tool that performs processing according to image data. Further, an example of an external device is not limited to the PC, but can also include a smartphone or a tablet computer.

The appearance of the operation panel 13 shown in FIG. 2 is merely an example, and the arrangement of each button and the number of buttons are not necessarily limited to the example shown in the figure. Further, each button may be a mechanical button or a soft button that is displayed on the touch panel. According to the present embodiment, an example of the display 31 is configured to display two lines of text, but the display 31 may be configured to display only one line or three or more lines of text.

In the present embodiment described above, the setup procedure according to the first method is to connect to the PC 5 according to the WFD method, but the connection method is not necessarily limited to the WFD method. For example, the MFP 1 may be connected according to a proximity wireless communication, or a wired connection such as a USB connection.

According to the present embodiment, it is assumed that the connection information of only one access point is stored in the AP information 23. However, the MFP 1 may be configured to store the connection information of a plurality of access points. In such a case, the MFP 1 may use the connection information of connectable access points from among the plurality of pieces of stored connection information.

In the present embodiment, when the AP information 23 is obtained in the setup procedure according to the first method, the setup procedure according to the second method is not performed even if the connection with the access point fails. However, such a configuration may be modified and the setup procedure according to the second method may be performed in such case. However, if the connection to the access point fails after obtaining the AP information 23, there is a high possibility that the problem is on the access point side and it is likely that the connection will fail even if the setup procedure according to the second method is performed. Therefore, it is preferable to terminate the setup procedure after the success or failure of connection to the access point is notified.

According to the present embodiment, the MFP 1 is configured to retry when the connection to the access point fails after obtaining the AP information 23. It is noted that the MFP 1 may be configured not to retry even if the connection to the access point fails after obtaining the AP information 23. For example, S135 in the setup process may be deleted, and the process may be modified such that, when the connection fails (S132: NO), the setup process may be terminated immediately after the notification in S134. It is noted, however, if the communication environment for connecting to the access point is poor, there is a possibility that the connection can be established by retrying, and thus the possibility of a successful connection is increased by retrying a particular number of times.

Further, according to the present embodiment, when the obtaining of the AP information 23 according to the first method fails, a notification is provided to indicate that the second method has been started. However, such a configuration may be modified such that no notification is provided. It is noted, however, by notifying the user, it is possible to encourage the user to take action, for example, to check the execution status of the connection application of the PC. Further, the MFP 1 may be configured to interrupt the setup procedure by operating the cancel button or the like. In such a case, for example, a user who does not wish the second method to be executed could know when to cancel by the notification.

According to the above-described embodiment, by operating the input button group 33, the setup procedure according to the second method can be started without performing the setup procedure according to the first method. However, the configuration may be modified such that the setup procedure according to the second method cannot be performed without performing the setup procedure according to the first method. That is, according to a modification, the instructions for setting up a connection to an access point in a wireless LAN may always be received by the operation of the wireless connection button 32.

According to the present embodiment, when power-on is received without AP information 23 stored in the memory 12, the setup procedure according to the first method is performed. However, the configuration may be modified such that the setup procedure according to the first method may not be performed. In other words, the start process may be eliminated.

In any flowchart disclosed in the present embodiment, a plurality of processes in any plurality of steps can be arbitrarily changed in the order of execution, or executed in parallel, to the extent that there is no inconsistency in the processing content.

The processes disclosed in the embodiment may be performed by a single CPU, multiple CPUs, hardware such as an ASIC, or a combination thereof. Further, the processes disclosed in the embodiments may be realized in various forms, such as a non-transitory computer-readable recording medium in which instructions realizing a program for executing processes is contained, or a method.

What is claimed is:

1. An electronic device, comprising:
 a particular button;
 an input interface having multiple buttons different from the particular button and configured to be used to input characters or a selection operation;
 a communication interface configured to perform a wireless communication;
 a display;
 a memory; and
 a controller,
 wherein the controller is configured to perform:
 starting a setup procedure according to a first method based on an operation to the particular button,
 in the setup procedure according to the first method:
 notifying a start of the setup in the setup procedure according to the first method;
 attempting to obtain connection information from an external device according to a first procedure;
 when the connection information is obtained successfully in the setup procedure according to the first method;
 storing the connection information, which is obtained according to the first procedure, in the memory; and
 attempting to connect to an access point of a wireless network using the connection information, which is obtained according to the first procedure; and
 starting a setup procedure according to a second method when the connection information is not obtained in the setup procedure according to the first method,
 in the setup procedure according to the second method:
 displaying a message requesting input of the connection information on the display;
 obtaining the connection information according to a second procedure, the connection information including characters input through the input interface;
 storing the connection information, which is obtained according to the second procedure, in the memory; and
 attempting to connect to the access point of the wireless network using the connection information obtained according to the second procedure.

2. The electronic device according to claim 1,
 wherein, in the setup procedure according to the first method, the controller is configured to perform:
 notifying a start of the setup in the setup procedure according to the first method;
 attempting to obtain the connection information according to the first procedure;
 storing the connection information, which is obtained according to the first procedure, in the memory when the connection information is obtained successfully;
 attempting to connect to the access point of a wireless network using the connection information obtained according to the first procedure;
 when the connection to the access point is succeeded, notifying success of connection to the access point; and
 when the connection to the access point is failed, notifying failure of connection to the access point.

3. The electronic device according to claim 2,
 wherein, in the setup procedure according to the first method, the controller is configured to perform:
 notifying the failure of connection to the access point when the connection to the access point is failed in the setup procedure according to the first method; and
 attempting to connect to the access point after notifying the failure of connection.

4. The electronic device according to claim 1,
 wherein, in the setup procedure according to the first method, the controller is configured to perform:
 establishing the wireless communication with the external device; and
 obtaining the connection information from the external device in a state where the wireless communication with the external device being established, wherein a program is implemented in the external device, when the wireless communication with the external device is established, the program causing the external device to transfer the connection information to the electronic device, the connection information being obtained according to the first procedure,
 wherein, in the setup procedure according to the second method, the controller is configured to perform:
 searching for an access point to which the electronic device is connectable;
 selecting an access point targeted to be connected from among access points searched in the searching, the access point targeted to be connected being selected according to a selection operation input through the input interface;
 obtaining a part of connection information corresponding to the access point as selected; and
 obtaining an other part of the connection information by inputting of characters through the input interface, the other part of the connection information corresponding to the access point selected in the selecting of the access point,
 wherein, in the setup procedure according to the second method, the controller is configured to perform:
 when obtaining the other part of the connection information by inputting of characters through the input interface, displaying a message requesting for input.

5. The electronic device according to claim 4,
 wherein, in the setup procedure according to the first method, the controller is configured to perform:
 detecting the external device existing in vicinity using a wireless communication according to a first wireless communication method; and obtaining the connection information from the external device using the wireless communication according to the first wireless communication method, and wherein, in the setup procedure according to the second method, the controller is configured to perform, and stopping the wireless communication according to the first wireless communication method;

detecting a connectable access point using the wireless communication according to the second wireless communication method;

selecting a target access point to be connected from among access points detected in the detecting of the connectable access point, the target access point being selected according to a selection operation input through the input interface; and obtaining the other part of connection information corresponding to the access point, the other part of the connection information including characters input through the input interface, the characters input being input based on the connection information obtained, from the target access point, through the wireless communication according to the second wireless communication method.

6. The electronic device according to claim 4, wherein, in the setup procedure according to the second method, the controller is configured to perform:

displaying a message requiring input of the connection information on the display;

obtaining the connection information according to the second procedure, the connection information including characters input through the input interface;

storing the connection information which is obtained according to the second procedure in the memory;

attempting to connect to an access point of a wireless network using the connection information obtained according to the second procedure;

when the connection to the access point is succeeded, notifying success of connection to the access point; and when the connection to the access point is failed, notifying failure of connection to the access point.

7. The electronic device according to claim 1, wherein the controller is configured to start the setup procedure according to the second method in response to receipt of a plurality of particular selection operations input through the input interface, and wherein the controller is configured to start the setup procedure according to the second method without receiving the plurality of particular selection operations when the connection information is not obtained in the setup procedure according to the first method.

8. The electronic device according to claim 1, wherein the controller is configured to:

start the setup procedure according to the first method based on an operation on the particular button regardless of whether the connection information is stored in the memory;

when the connection information has been stored in the memory, overwrite the connection information in a case where the connection information is obtained in the setup procedure according to the first method; and when the connection information has been stored in the memory, overwrite the connection information in a case where the connection information is not obtained in the setup procedure according to the first method and the connection information is obtained in the setup procedure according to the second method.

9. The electronic device according to claim 1, wherein, in a case where the connection information is not stored in the memory, the controller is configured to perform starting the setup procedure according to the first method in response to a particular connection condition being satisfied, the particular connection condition not including the operation of the particular button, wherein:

in a case where the setup procedure according to the first method has been started based on the operation of the particular button, starting the setup procedure according to the second method when the connection information is not obtained in the setup procedure according to the first method; and in a case where the setup procedure according to the first method has been started in response to the particular connection condition being satisfied, not starting the setup procedure according to the second method when the connection information is not obtained in the setup procedure according to the first method.

10. The electronic device according to claim 9, wherein the particular connection condition includes a power-on of the electronic device.

* * * * *